No. 686,109. Patented Nov. 5, 1901.
F. MÜLHENS.
NIPPLE.
(Application filed Jan. 5, 1900.)
(No Model.)
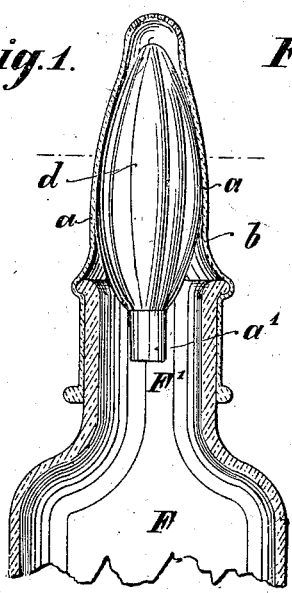
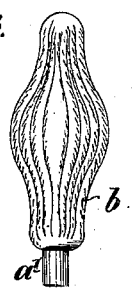
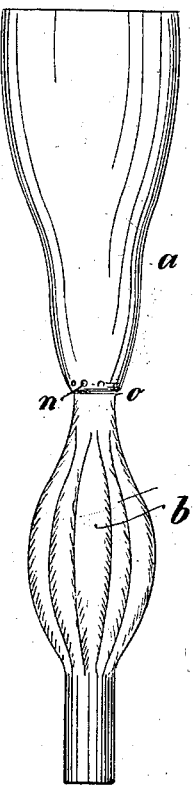
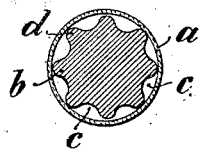
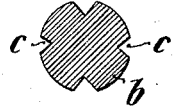
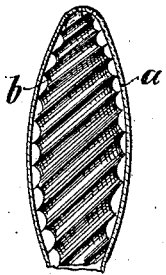
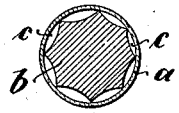
Witnesses:
Paul Hunter
C. E. Holske
Inventor
Ferdinand Mülhens
By Munn
Attorneys

UNITED STATES PATENT OFFICE.

FERDINAND MÜLHENS, OF COLOGNE, GERMANY.

NIPPLE.

SPECIFICATION forming part of Letters Patent No. 686,109, dated November 5, 1901.

Application filed January 5, 1900. Serial No. 476. (No model.)

*To all whom it may concern:*

Be it known that I, FERDINAND MÜLHENS, a subject of the King of Prussia, Emperor of Germany, residing at Cologne-on-the-Rhine, in the Kingdom of Prussia, German Empire, have invented certain new and useful Improvements in Nipples, (for which I have applied for patents in England, No. 23,188, dated November 21, 1899; in France, dated November 18, 1899; in Belgium, dated November 18, 1899, and in Germany, dated November 11, 1899,) of which the following is a specification.

In sucking milk or other liquids from bottles fitted with the usual hat-shaped stoppers or rubber nipples apart from the pressure of the lips of the jaws of the infant itself the outer atmospheric air (as soon as the air contained in the bottle has become rarefied to some extent) acts to compress the comparatively unresistant walls of the nipple, so that the latter is in most cases and in a very short time squeezed flat, so as to thereby prevent wholly or partly the further flow of the milk until the child instinctively releases the nipple, whereupon the walls of the same can then expand again, and fresh air enters from outside through the nipple into the interior of the bottle. This operation is repeated at very short intervals of time, and the taking of food resulting therefrom and which occurs at periodically irregular intervals serves to rapidly tire the infant, while also the liquid in the bottle becomes cold very soon, and the finally the simultaneous absorption of large quantities of air into the stomach, which is thereby produced, has the result of causing the infant after it has taken its food from the bottle always to throw up wind strongly, with the further result of usually throwing up a portion of the food it has taken as well. If it were attempted to avoid to some extent these drawbacks of the ordinary rubber nipple by employing the obvious means—namely, using a solid rubber stopper formed with a central hole—then the aforesaid drawbacks would certainly be obviated to some extent; but then there would be produced the drawback, which is of great importance in hygienic respect, that it is only possible to clean the stopper in a faulty manner, so that apart from other drawbacks this last kind of stopper has not become usually employed.

Now the present invention relates to an insertion-piece for the rubber nipple mentioned at the commencement of this specification, which has for its object to obviate or to diminish the drawbacks mentioned by inserting said insertion-piece into the rubber nipple when in use, so as to fill up the cavity in the same, while the passage of liquid therethrough is allowed by means of channels or grooves, &c., provided in its outer periphery. With this peculiar formation of the insertion-piece it is only when the sucking power of the child is no longer sufficient to take up the liquid contained in the bottle that the taking of food is interrupted, whereas in the case of the usual nipple interruptions in the flow of food frequently take place by reason of the air that acts to compress the nipple.

This invention is illustrated in several modifications, by way of example, in Figures 1 to 8 of the accompanying drawings.

Before the rubber nipple $a$, Fig. 1, is slipped over the neck $F'$ of the bottle $F$ there is inserted into it an elongated round insertion-piece $b$, which is suitably made to conform to the shape of the nipple and is composed of elastic material, rubber, hollow celluloid with thin walls, &c. This piece is formed in its periphery with any kind of grooves, channels, incisions, and the like extending from top to bottom, whereby intermediate air-spaces $c$, Fig. 2, are formed between the inner wall of the rubber nipple $a$, which fits the insertion-piece $b$ wholly or partially and with some degree of tightness, and the said insertion-piece instead of the incisions, channels, grooves, or the like may also be formed prism-shaped, or half-round ribs $d$ on the periphery of the insertion-piece $b$, it being immaterial whether these ribs extend on the periphery in an axial manner, as shown in the examples given in Figs. 1 and 3, or spirally or helically, as in the example shown in Fig. 4. Further, the round "periphery-piece" might also be provided with corrugations, round or pyramidal prominences, or the like; but in all cases it is necessary that the body $b$ shall form between its outer periphery and the walls of the surrounding rubber nipple air-spaces through which the milk or other liquid being sucked up is enabled to flow upward. For the purpose of enabling the insertion-piece to be readily inserted into and removed from the rubber nipple there is provided in the lower end of the insertion-piece a stem-like extension $a'$ or any other suitable kind of handle. As already stated, the milk flows by the suction between the inner walls of the nipple and the outer periphery of this insertion-piece $b$ upward through the intermediate air-spaces $c$, formed thereby, without allowing the walls of the rubber nipple to be compressed together or collapsed. By this means the amount of flow is always uniform and it flows continually into the mouth of the infant. A greater or less amount of flow is regulated by proportioning the passages provided for the flow. In order to clean the body $b$, the said body after removal from the nipple is rinsed under a water-tap or in a vessel, or it may be cleaned with the aid of a brush, so as to remove all adhering particles of fluid from the grooves and passages. The body is then inserted again for use. The insertion-piece $b$ may also be made of polygonal shape in cross-section, as shown in Fig. 7; but in this case the sides of the polygon must be made concave in order to prevent the walls of the rubber nipple $a$ from bearing flat upon the same. Further, the body $b$ may also be connected direct with the nipple to form one single piece. This modification is illustrated in Fig. 8 and consists of the insertion-piece $b$ and of the rubber nipple $a$, which is connected to it at $o$ and which is of course provided with suction-holes in the neighborhood of $o$. When in use, the nipple $a$ is drawn over the body $b$ and is pushed back again therefrom for the purpose of cleaning the same.

What I claim, and desire to secure by Letters Patent of the United States, is—

1. An insertion-piece for nipples or the like consisting of a body having grooves and ridges on its exterior surface, the said body being shaped to correspond approximately with the form of the interior of the nipple and having its greatest diameter at a point intermediate its ends, the said ridges pressing on the inner surface of the nipple, whereby the grooves form with the inner surface of the nipple independent channels for the passage of the milk.

2. The combination with a nipple, of an insertion-piece made in one piece with the nipple, and consisting of a solid body having grooves and ridges on its exterior surface, the said body being shaped to correspond approximately with the form of the interior of the nipple and forming with the inner surface thereof independent channels for the passage of the milk, the said nipple being pulled over the insertion-piece when in use, and pulled off the same for the purpose of cleaning.

In testimony whereof I have hereunto set my hand in the presence of two witnesses.

FERDINAND MÜLHENS.

Witnesses:
L. BARNES,
JOHANNA SCHOLZ.